COMMUNICATION SYSTEM AND SIGNAL RECEIVER THEREFOR

Filed July 2, 1947 3 Sheets-Sheet 1

Thomas Harold Flowers

By Hall & Houghton attorneys

July 18, 1950 T. H. FLOWERS 2,515,553

COMMUNICATION SYSTEM AND SIGNAL RECEIVER THEREFOR

Filed July 2, 1947 3 Sheets-Sheet 2

Thomas Harold Flowers

By Hall & Houghton attorneys

COMMUNICATION SYSTEM AND SIGNAL RECEIVER THEREFOR

Filed July 2, 1947 3 Sheets-Sheet 3

Thomas Harold Flowers

By Hall & Houghton
attorneys

Patented July 18, 1950

2,515,553

UNITED STATES PATENT OFFICE 2,515,553

COMMUNICATION SYSTEM AND SIGNAL RECEIVER THEREFOR

Thomas Harold Flowers, London, England

Application July 2, 1947, Serial No. 758,641
In Great Britain June 20, 1946

Section 1, Public Law 690, August 8, 1946
Patent expires June 20, 1966

6 Claims. (Cl. 179—1)

Figure 1:
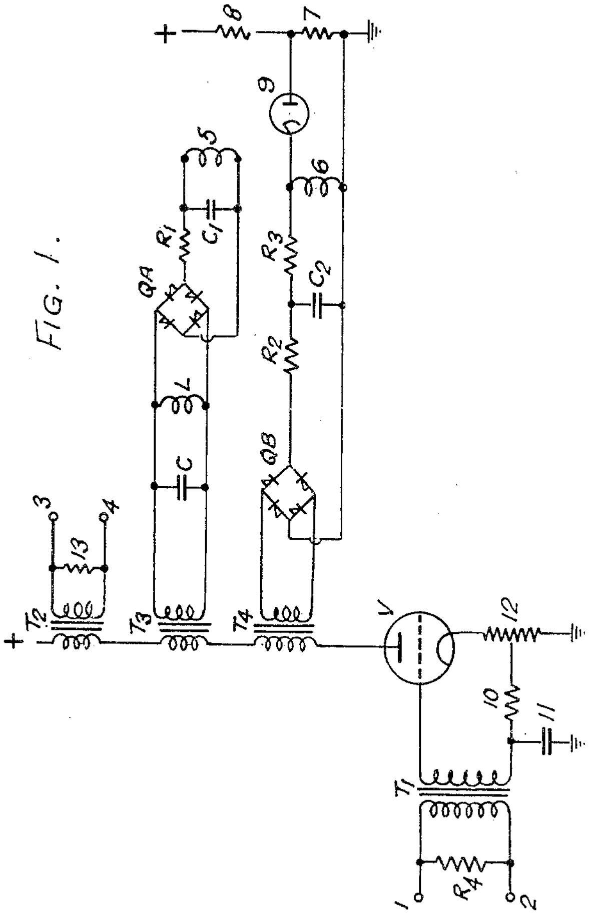

This invention relates to signal receivers for communication systems.

The invention relates more particularly to signal receivers for voice-frequency signalling systems.

Modern speech communication systems are arranged to transmit a band of frequencies only sufficient for intelligible speech and are commonly arranged to overload when the highest peak speech voltages are applied to the systems. Signals transmitted along such systems necessarily fall within the said frequency band and within the same amplitude limits.

In order, at least to some degree, to avoid signal imitation, i. e. the actuation of a signalling device by speech currents, the signal receiver in such a communication system is arranged to comprise a signal circuit, which actuates the signalling device when energised by a frequency or frequencies within a narrow band of frequencies, and a guard circuit which when energised by a range of frequencies, which may include the frequency or frequencies to which the signal circuit responds, is intended to oppose the action of the signal circuit and prevent actuation of the signalling device. Thus, if signals are transmitted to the signal receiver the signal circuit is excited strongly and the guard circuit is excited only weakly if at all. The more sensitive the guard circuit is made the greater the protection this circuit provides against signal imitation. As, however, the danger of signal interference, that is the action of speech currents in distorting signals transmitted at the same or nearly the same time, as the speech currents, is greater the greater the sensitivity of the guard circuit, a compromise is commonly adopted so that some liability to signal imitation still remains.

Further, by arranging the signal circuit to have comparatively low sensitivity, i. e. by raising the lowest signal level to which the signal circuit will respond, the liability to signal imitation can be reduced. It might therefore appear that, by giving the signal circuit a comparatively low sensitivity and suitably choosing the sensitivity of the guard circuit, signal imitation could be entirely avoided. It is, however, found that reduction of the sensitivity of the signal circuit to a value too close to that of the minimum signal level is liable to produce distorted response and unreliable operation.

An object of the invention is to produce a signal receiver having improved characteristics as regards reliable operation and reduced liability to signal imitation.

A further object of the invention is to provide a signal receiver which does not respond to signals below a predetermined amplitude but which responds reliably to signals only slightly above said predetermined amplitude.

According to the invention a signal receiver for actuating a signalling device upon the reception from the system of signal currents at a frequency or frequencies falling within a band of frequencies used for the transmission of information over the system comprises means arranged to prevent the receiver from actuating said device during the reception of currents at the signal frequency or frequencies when said currents are below a predetermined amplitude, the arrangement being such that when currents received from the system rise above said predetermined amplitude the influence of said means is removed from the receiver.

Further according to the invention, a signal receiver for actuating a signalling device upon the reception from the system of signal currents at a frequency or frequencies falling within a band of frequencies used for the transmission of information over the system comprises a signal circuit and a guard circuit, means for preventing the signal circuit from actuating said device while said currents are below a predetermined amplitude, said means being arranged to exert substantially no influence to prevent actuation of the device when currents received from the system rise above the predetermined amplitude, and means dependent on the current in the guard circuit for producing a variable bias which opposes the actuation of the said device by the signal circuit so as to reduce signal distortion due to variation in the amplitude of the signal currents.

Figures 2, 2A, 2B, 2C:
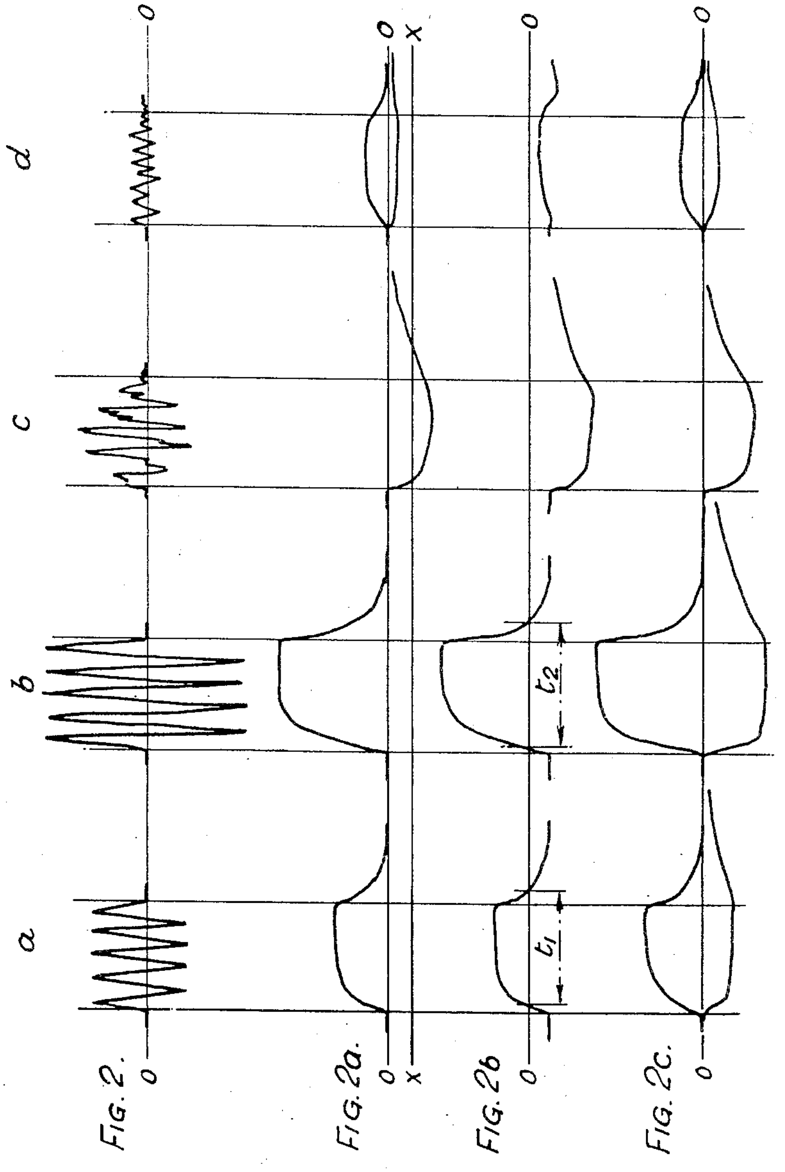
Figures 2D, 2E, 2F:
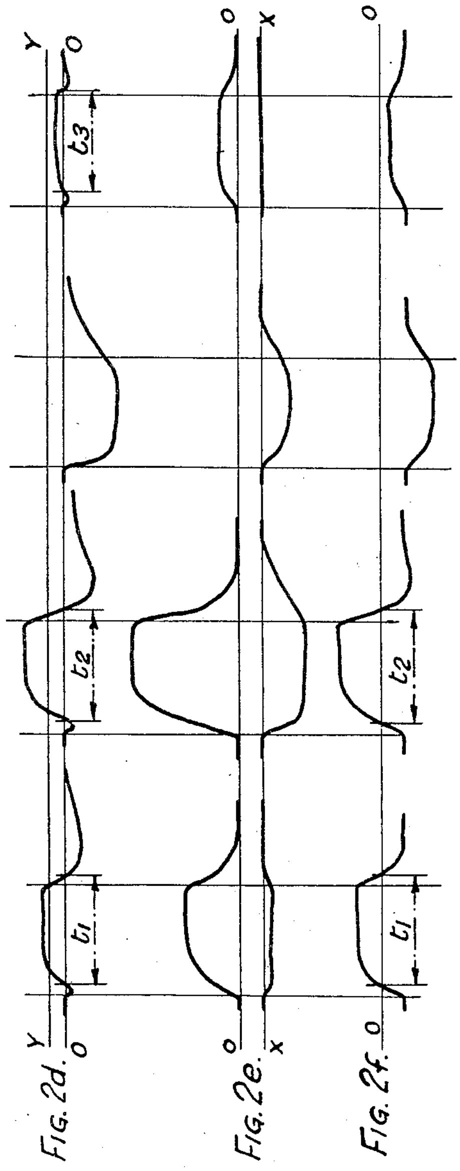
Figure 3:
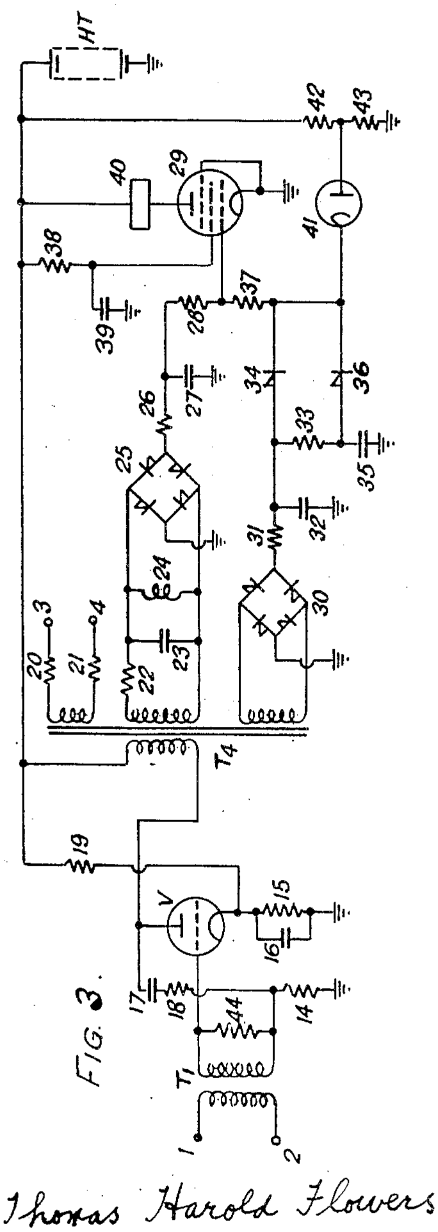

The invention will be described by way of example with reference to the accompanying drawings in which Fig. 1 shows the circuit arrangement of a signal receiver embodying the invention, Figs. 2, 2*a*, 2*b*, 2*c*, 2*d*, 2*e*, and 2*f* show curves of currents which appear in the receiver and Fig. 3 shows a further circuit arrangement.

Referring first to Figs. 2 to 2*f*, each figure shows curves of four separate currents displaced along a horizontal time base O—O and marked *a*, *b*, *c* and *d* respectively. It is to be understood that these currents appear in a signal receiver having a signal circuit and a guard circuit. In Fig. 2, current *a* is a signal current of the minimum amplitude which appears in the system to which the receiver is connected, current $b$ is a signal current of maximum amplitude, current $c$ is a speech wave which produces current in the guard circuit only and current $d$ is a speech wave which produces slightly more current in the signal circuit than it does in the guard circuit.

The receiver under consideration is provided with a guard circuit which is unresponsive to currents at the signal frequency.

Fig. 2$a$ shows, above the line O—O, the rectified currents produced in the signal circuit, and, below the line O—O, the rectified currents produced in the guard circuit by the currents of Fig. 2. The signal currents will, owing to the narrow band width of the filter circuits in the signal circuit, build up and die away relatively slowly through the filter and the rectified current in the signal circuit can be arranged to build up and die away at substantially the same rates. The much wider band width of the guard circuit enables the guard current to build up relatively much more quickly than the signal circuit current builds up while, with a suitably designed D. C. load circuit, the guard circuit current can be arranged to die away more slowly. In order to ensure that the signalling relay actuated by the receiver is held unoperated when the receiver is quiescent it is the common practice to apply a steady bias current which is indicated by the horizontal line $xx$ in Fig. 2$a$.

The effective sum of the signal guard and bias currents of Fig. 2$a$ is shown in Fig. 2$b$, the current shown below the line O—O serving to cause the signalling relay to be released while the current shown above this line serves to actuate the relay.

The currents may be employed in the operating and bias windings of an electro-mechanical polarised relay used as the signalling relay and the explanation to be given assumes the employment of the currents in such manner. The explanation is, however, equally applicable where the currents are used to actuate a single current relay biassed by rectifiers. It will be appreciated also that the explanation is applicable to the voltages applied to the grid of an electronic valve operating a relay in its anode circuit.

It will be observed from Fig. 2$b$ that the times $t_1$ and $t_2$, during which the relay is operated are unequal and, with the fixed bias arrangement employed, such inequality and the resulting distortion are inevitable. If a bias which varies with the signal amplitude is employed, signal distortion can be reduced and the invention provides an improved manner of providing such bias. The bias is derived by rectifying the received current and, in the arrangement provided by the invention, is obtained from the guard circuit as will be described later. The guard circuit in this arrangement is untuned and responds substantially equally to all the frequencies received from the transmission circuit to which the receiver is connected. Thus, when a signal is received, the guard circuit produces a bias $x$ current which is proportional to the signal amplitude and, when speech is being received it produces a bias current which is proportional to the total speech current.

Fig. 2$c$ shows the currents which appear when the guard circuit is used to provide a variable bias, the signal currents which tend to actuate the signalling relay being shown above the line O—O while the guard currents which tend to release the relay are shown below this line. The signal current build-up times are again about equal to the decay times. The guard decay time is longer than the signal decay time but is made less than the minimum time which elapses between successive signals.

The effective sum of the signal and guard currents is shown in Fig. 2$d$, the currents above the line O—O tending to cause the signalling relay to operate while the currents below the line tend to cause the relay to remain unoperated or to return to the unoperated position. In Fig. 2$d$ the signal times $t_1$ and $t_2$ are equal or nearly so. The signal and guard currents are proportioned so that the times $t_1$ and $t_2$ are equal to the signal time and, assuming the relay operates and releases on zero current and neglecting transit time of the relay contact, bias in the relay and fortuitous distortion, the receiver operates without distortion to signals of any amplitude. It will be observed, however, that the receiver still operates falsely on reception of the speech wave $d$ of Fig. 2. It will be appreciated that the false response to the wave $d$ can be avoided by introducing a fixed bias such as would, for example, move the line O—O to the position Y—Y but such a bias would re-introduce the distortion as described with reference to Fig. 2$b$.

It will be appreciated that, due to the liability of a relay to mechanical, electrical and magnetic bias, the relay will, if uncontrolled and governed only by its own biases, be liable to take up either of its two, i. e. operated or released, positions and it will be seen from Figs. 2$c$ and 2$d$ that, when the receiver is unexcited by current from the communication system and the guard circuit is consequently not excited, the relay will be uncontrolled. Although the distortion which would result from a small bias such as would move the line O—O to Y—Y as shown in Fig. 2$d$, can be reduced if the receiver is designed so that the effective operating current is many times the bias current when receiving the minimum signal amplitude such an expedient would result in the receiver responding, although with distortion, to signals at much lower levels and speech currents well below the minimum signal level for relatively undistorted response would result in signal imitation.

The invention seeks to avoid the undesirable effects of a fixed bias which produces the distortion referred to while avoiding the resort to the expedient just described and at the same time to provide a bias which will ensure that the relay is in its released position when no input is applied to the receiver.

The arrangement embodying the invention is illustrated by Figs. 2$e$ and 2$f$. As shown in Fig. 2$e$ a large bias is applied as represented by the line $x$—$x$. This bias however is arranged to disappear when the guard circuit reaches a predetermined value whereupon the effective currents in the circuits become those shown in Fig. 2$f$ as far as currents $a$ and $b$ are concerned, i. e. are substantially those shown in Fig. 2$d$ ignoring the line Y—Y in that figure.

As will be seen from Figs. 2$d$, 2$e$ and 2$f$ the response of the receiver to the signals $a$ and $b$ of Fig. 2 is affected by the bias only to the extent that the guard current builds up, from the bias value, a little faster and the effect of the difference between the currents $a$ and $b$ of Figs. 2$d$ and 2$f$ on receiver distortion is insubstantial.

As regards current $d$ in Fig. 2$f$, this current is shown below the line O—O as the large bias, which is applied before the current in the guard circuit reaches the value when this bias disappears, is sufficiently great to prevent the receiver responding to the current *d*.

A circuit arrangement which is designed to operate in the manner illustrated by Fig. 2*f* is shown in Fig. 1. In this arrangement, a V. F. receiver is adapted to be inserted at the signal receiving point in the receive channel of a 4-wire communication system. The receiver, comprising the transformers $T_1$, $T_2$, $T_3$, $T_4$ and the components of apparatus coupled thereto which will be described in greater detail forthwith, is connected to the 4-wire system at the terminals 1, 2 and 3, 4, the input to the receiver being applied via the terminals 1, 2.

The input terminals 1, 2 are connected to the primary of a transformer $T_1$, preferably of high step-up ratio, the secondary winding of which is connected across the control grid and cathode of a valve V which may be a triode or multi-grid valve. The input terminals 1, 2 are bridged by a resistance $R_4$ to terminate the line correctly while it is arranged that between the input terminals 1, 2 and the output terminals 3, 4 there is a small or no gain as required by the circuit. The valve V has, in series in its anode circuit, a transformer $T_2$ to provide the output to terminals 3, 4 and a transformer $T_3$ to feed the signal circuit tuned by condenser C and inductor L, the current from the secondary of transformer $T_3$ being rectified by full-wave rectifier QA, smoothed by resistor $R_1$ and condenser $C_1$ and applied to the operating winding 5 of an electro-mechanical polarised signalling relay. Also in series in the anode circuit of valve V is a third transformer $T_4$, the current in the secondary winding of which is rectified by full-wave rectifier QB, smoothed by resistor $R_2$ and condenser $C_2$ and applied via resistor $R_3$ to the bias winding 6 of the signalling relay. The resistors $R_2$ and $R_3$ and the condenser $C_2$ in conjunction with the rectifier QB and winding 6 are designed so that the current in the winding 6 builds up quickly and decays slowly. The bias which is arranged to disappear when the current in the guard circuit reaches a predetermined amplitude is derived from a potentiometer, formed by resistors 7 and 8, which is connected with the supply to the anode of valve V. A voltage obtained from the potentiometer is applied to a rectifier, in the case shown in Fig. 1 a diode 9 and applied by the diode 9 to the winding 6. In the absence of an input to the receiver, current flows from the anode battery via resistor 8 and the diode 9 through the bias winding 6 of the signalling relay. When a signal is received, current from the signal circuit comprising transformer $T_3$, condenser C, inductor L, rectifier QA, resistor $R_1$ and condenser $C_1$ flows through the operating winding 5 of the signalling relay and current from the guard circuit comprising transformer $T_4$, rectifier QB, resistors $R_2$ and $R_3$ and condenser $C_2$ flows through the bias winding 6 of the signalling relay. As the guard circuit current will, when the signal current reaches the minimum amplitude, exceed the bias current provided by potentiometer resistors 7 and 8, the diode 9 will eventually become non-conducting and thus remove the bias current provided by the potentiometer.

The signal current will exceed the guard current and the operation will be such as was described with reference to Figs. 2*e* and 2*f*.

Speech currents applied to the input of the receiver produce guard circuit currents and also signal circuit currents if they fall within the pass-band of the signal circuit. Signal imitation will not occur unless the signal circuit current is large enough to overcome the effect of both the guard circuit and the bias currents as will be understood from the description with reference to Figs. 2 to 2*f*.

The valve V is provided in its cathode circuit with a resistor 12 to provide negative feed-back in order to increase the impedance of the anode circuit. The grid bias for valve V is derived from the cathode resistor 12 by resistor 10 and condenser 11 in known manner.

The receiver is protected against signal interference coming back along the receive channel and applied to terminals 3, 4 by the high impedance of the anode of valve V and the series connection of transformers $T_1$, $T_2$ and $T_3$ in the anode circuit. Currents fed into terminals 3, 4 are thereby very considerably attenuated when they reach the signal and guard circuits and appear mostly in resistor 13.

Another arrangement for carrying out the invention is shown in Fig. 3. In this arrangement the signalling receiver is inserted at the signal receiving point in the receive channel of a 4-wire circuit at the terminals 1, 2 and 3, 4 as in the arrangement of Fig. 1. The correct terminating impedance is provided for by the resistor 44 which is connected across the secondary of transformer $T_1$. One terminal of the secondary is connected to the control grid of valve V which is shown as a triode but which may be a multi-grid valve. The anode circuit of valve V includes the primary of transformer $T_4$ and is connected via condenser 17 and resistor 18 in series to the other terminal of transformer $T_1$ secondary and one side of resistor 14, the other side of which is earthed. Condenser 17 and resistors 18 and 14 apply negative feed-back to the grid of valve V and cause the anode circuit of this valve to have low impedance. A suitable grid bias is provided for valve V by resistors 15 and 19, the junction point of the two resistors being connected to the cathode of the valve, the other ends of resistors 15 and 19 being connected to earth and positive terminal of battery HT respectively, the negative terminal of the battery also being earthed. Resistor 15 is shunted by condenser 16 to prevent negative feed-back by resistor 15. Transformer $T_4$ has three secondary windings. One winding is connected via equal resistors 20 and 21, usually 300 ohms each, to the output terminals 3, 4. Between the input terminals 1 and 2 and the output terminals 3, 4 there is a small or no gain as required by the circuit. A second secondary winding of transformer $T_4$ supplies current to the signal circuit of the receiver. This winding has one terminal connected to one side of resistor 22, the other side of which is joined to one side each of condenser 23 and inductor 24 which together are tuned to the signal frequency which may be, for example 2000 cycles per second. The second terminal of the winding is connected to the other sides of the condenser 23 and inductor 24. The full-wave dry-plate rectifier 25 is bridged across the parallel connection of condenser 23 and inductor 24 and has its positive voltage output terminal earthed and its negative voltage output terminal joined to one side of a resistor 26, the other side of which is connected to one side of a condenser 27, which has its other side earthed, and to one side of a resistor 28 the other side of which is connected to the grid of valve 29 which is shown as a pentode valve. The third secondary winding of transformer $T_4$ supplies current to the guard circuit of the receiver. It is connected to the full-wave dry-plate rectifier 30, the negative voltage terminal of which is earthed and the positive voltage terminal of which is connected to one side of resistor 31. The other side of resistor 31 is connected to one side of condenser 32, one side of resistor 33 and the negative plate of a dry-plate rectifier 34. The remaining side of condenser 32 is earthed. The remaining side of resistor 33 is connected to one side of a condenser 35, the other side of which is earthed, and to the negative plate of a dry-plate rectifier 36. The positive plates of rectifiers 34 and 36 are joined together and to one side of resistor 37, the other side of which is connected to the common connection of resistor 28 and the grid of valve 29. The screen grid of valve 29 is joined via resistor 38 to the positive terminal of battery HT and to one side of a condenser 39, the other side of which is earthed. The suppressor grid of valve 29 is joined to the cathode and the anode is connected to the positive terminal of battery HT via the operating coil of signalling relay 40. In the absence of an input to the receiver, the grid of valve 29 is at earth potential. The valve is therefore fully conducting and relay 40 is operated. When a signal is received, a voltage at the signal frequency appears across the parallel tuned circuit 23 and 24, is rectified by rectifier 25, smoothed by resistor 26 and condenser 27 and builds up a negative voltage, which will be called the signal voltage, on the side of the condenser 27 joined to resistor 28. The voltage will not build up instantaneously chiefly because of the tuning but will eventually reach a steady value which is proportional to the voltage of the signal at the input terminals. At the same time rectifier 30 will produce a positive voltage which will quickly build up on the unearthed side of condenser 32 and more slowly on the unearthed side of condenser 35. When the signal ceases the negative voltage on condenser 27 decays at a rate chiefly determined by the tuned circuit, the positive voltage on condenser 32 dies away quickly, but that on condenser 35 more slowly. Rectifiers 34 and 36 cause the greater of the voltages on the condensers 32 and 35 to be effectively applied to resistor 37 and this greater voltage will be called the guard voltage. Resistor 31 and condenser 32 are so proportioned that the voltage on the condenser on application of a signal builds up faster than the signal voltage builds up on condenser 27. Resistor 33 and condenser 35 are so proportioned that the voltage on condenser 35 dies away on cessation of a signal more slowly than the signal voltage on condenser 27. The steady state values of the signal and guard voltage are so proportioned in conjunction with resistors 28 and 37 and the rates at which the several voltages build up and decay that the grid of valve 29 is made negative with respect to earth potential for a period equal to the duration of a signal and this condition can be substantially satisfied for all signal levels which do not overload the valve V. For all received signals the steady state negative voltage applied to the grid of valve 29 will greatly exceed the voltage necessary to cut off the anode current. The relay 40 is thus de-energised for periods substantially equal to the lengths of the signals and thus responds to signals substantially without distortion. Resistor 38 and condenser 39 cause the current through the relay 40 to peak on energisation and have a beneficial effect on impulsing. The relay is prevented from responding to signal levels much lower than the lowest received signal level by the diode 41. The valves V, 29 and 41 have their cathodes heated by means not shown in Fig. 3. The diode has its cathode connected to the common connection of resistor 37 and the rectifiers 34 and 36 and its anode to the junction point of two resistors 42 and 43, the remaining terminals of which are connected respectively to the positive terminal of battery HT and to earth. The anode of diode 41 is thus maintained at a suitable positive potential with respect to earth and has a conductance in the conducting direction which is low enough to ensure that its cathode cannot fall in potential much lower than said positive potential. This potential is arranged to be only slightly less than the guard voltage built up by the lowest level signal to which the receiver is required to respond. The diode is non-conducting under these conditions and hence does not affect the response of the receiver to genuine signals. On signal levels only slightly less than the lowest received signal the diode becomes conducting. The receiver is unable to respond unless the signal voltage on condenser 27 is more negative with respect to earth potential than the anode of diode 41 is positive with respect to earth potential in the ratio of the resistance of resistor 28 to that of resistor 37. Because diode 41 is non-conducting over the working range of received signal levels the receiver responds reliably and substantially without distortion to signals, yet at a signal level only slightly, for example 6 db. less than that level at which the diode is fully effective and no response of the receiver can take place.

In the arrangement of Fig. 3, the receiver is protected against signal interference by currents which may be speech currents or switching surges or other noise currents coming back along the receive channel and being applied to terminals 3, 4 by the secondary winding of transformer $T_4$, which is connected to resistors 20 and 21, having very low impedance. It has this low impedance by virtue of the low impedance of the anode circuit of valve V and the high turns ratio of the primary to the secondary winding of transformer $T_4$.

While valves 9 and 41 are shown in Figs. 1 and 3 it is to be understood that metal rectifiers can be used in place of these valves.

It will also be understood that the receiver may be provided with a number of signal circuits tuned to different signal frequencies.

In the foregoing description bias is obtained from an untuned guard circuit. The invention can however, be carried into effect by means of a guard circuit in which the output for a given input varies with frequency provided that the output at the signalling frequencies has a desired suitable value and is proportional to the input. In one arrangement employing a flatly tuned guard circuit the circuit shown in Fig. 1 is modified by shunting the primary winding of transformer $T_4$ with a condenser in series with a resistor, the resonant frequency of this circuit being below the signal frequency and suitably at a value of 1000 c./s.

I claim:

1. A signal receiver comprising an input, an output, an electronic amplifying valve having a control grid and an anode-cathode circuit, means connecting said input with the grid of said valve, means connecting said output with the anode-cathode circuit of said valve, a signal circuit, means connecting said signal circuit with anode-cathode circuit of said valve, a guard circuit, means connecting said guard circuit with the anode-cathode circuit of said valve, a signalling device, means connecting said signalling device with said signal circuit whereby said device is adapted to be responsive to currents in said signal circuit, means connecting said signalling device with said guard circuit whereby currents in said guard circuit oppose actuation of said signalling device by currents in said signal circuit, bias applying means for applying a fixed bias to oppose actuation of said signalling device by currents in said circuit only when the currents in the said guard circuit are below a predetermined value, and means for feeding back to the grid circuit of said electronic amplifying valve, in opposite phase to the input voltage at said grid, a proportion of the voltage produced by said input voltage at the anode of said valve whereby the valve is given a low anode impedance.

2. A signal receiver comprising a signal circuit, a signalling device in said signal circuit, a guard circuit, means for applying signal currents simultaneously to said signal circuit and to said guard circuit, means in said guard circuit responsive to said signal currents to provide a bias potential depending upon the amplitude of said signal currents, means for applying said bias potential to said signalling device so as to oppose actuation thereof by signal currents in said signal circuit, a source of fixed bias potential and means for applying said fixed bias potential to said signalling device to oppose actuation thereof by signal currents in said signal circuit only while signal currents applied to said guard circuit are below a predetermined amplitude.

3. A signal receiver according to claim 2 in which said signalling device is provided with an actuating winding and a biassing winding and in which means are provided for applying signal currents in said signal circuit to said actuating winding, the receiver also comprising means for connecting said guard circuit and said biassing winding and means for preventing the application to said actuating winding of said fixed bias potential when said signal currents in said guard circuit rise to a predetermined value and for replacing said fixed bias potential by said bias potential provided by said guard circuit.

4. A signal receiver according to claim 2 in which said source of fixed bias potential comprises a rectifier and in which means are provided for connecting said guard circuit to said means for applying said fixed bias potential to said signalling device and which render said rectifier non-conductive when said signal currents in said guard circuit rise to a predetermined value and which replace said fixed bias potential by said bias potential provided by said guard circuit.

5. A signal receiver according to claim 2 in which said signal circuit comprises an electronic valve including a control grid connected to said signal circuit whereby the current flow through said valve is dependent on signal currents in said signal circuit, means for connecting said signalling device to said electron valve to enable said signalling device to be energised by currents flowing through said valve and in which said source of fixed bias potential comprises a rectifier connected to said control grid, means being provided for connecting said guard circuit to said control grid and to said rectifier whereby said rectifier is rendered non-conductive when said signal currents in said guard circuit rise to a predetermined value and said fixed bias potential is replaced by said bias potential provided by said guard circuit.

6. A signal receiver according to claim 2 in which said guard circuit includes means for replacing said fixed bias potential applied to said signalling device by said bias potential dependent upon the amplitude of said signal currents applied to said guard circuit when said signal currents exceed a predetermined amplitude.

THOMAS HAROLD FLOWERS.

REFERENCES CITED

The following references are of record in the file of this patent:

UNITED STATES PATENTS

| Number | Name | Date |
|---|---|---|
| 1,696,274 | Johnson | Dec. 25, 1928 |
| 2,205,142 | Hoard | June 18, 1940 |
| 2,282,405 | Herrick | May 12, 1942 |
| 2,332,043 | Atkins | Oct. 9, 1943 |
| 2,370,388 | Baird | Feb. 27, 1945 |